United States Patent
Berry et al.

(10) Patent No.: US 8,449,145 B1
(45) Date of Patent: May 28, 2013

(54) MOUNTING APPARATUS FOR A LIGHT EMITTING DIODE MODULE

(75) Inventors: Travis Berry, Madison, AL (US); Ted Kluska, Madison, AL (US); Matthew Sullivan, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 209 days.

(21) Appl. No.: 13/100,934

(22) Filed: May 4, 2011

(51) Int. Cl.
*F21S 4/00* (2006.01)
*F21V 21/00* (2006.01)

(52) U.S. Cl.
USPC .................. 362/249.02; 362/457; 362/800

(58) Field of Classification Search
USPC .............. 362/225, 249.02, 457, 800
See application file for complete search history.

(56) References Cited

U.S. PATENT DOCUMENTS

| | | | |
|---|---|---|---|
| 5,388,357 A | 2/1995 | Malita | |
| 5,463,280 A | 10/1995 | Johnson | |
| 5,584,567 A | 12/1996 | Rumpel | |
| 5,726,535 A | 3/1998 | Yan | |
| 5,949,347 A | 9/1999 | Wu | |
| 6,036,336 A | 3/2000 | Wu | |
| 6,042,248 A | 3/2000 | Hannah et al. | |
| 6,268,801 B1 | 7/2001 | Wu | |
| 6,394,626 B1 | 5/2002 | McColloch | |
| 6,609,813 B1 | 8/2003 | Showers et al. | |
| 6,761,471 B2 | 7/2004 | Wu | |
| 6,853,151 B2 | 2/2005 | Leong et al. | |
| 7,040,783 B1 | 5/2006 | Christianson | |
| 7,510,299 B2 | 3/2009 | Timmermans et al. | |
| 7,600,907 B2 | 10/2009 | Liu et al. | |
| 2005/0269581 A1 | 12/2005 | Dry | |
| 2006/0120089 A1 | 6/2006 | Liberatore | |
| 2008/0278056 A1 | 11/2008 | Lukacs et al. | |

*Primary Examiner* — Jason Moon Han
(74) *Attorney, Agent, or Firm* — Waddey & Patterson, P.C.; Mark J. Patterson; Matthew C. Cox

(57) ABSTRACT

A mounting apparatus for a light emitting diode module provides a support structure for attaching a light emitting diode module directly to a light bulb in a lighting system. A bulb bracket includes a bulb clip that can be mechanically attached to a conventional bulb such as a fluorescent, neon or incandescent light bulb. A light emitting diode module can be secured to the bulb bracket using a module clip or another attachment means disposed between the bracket and the module. Additional light emitting diode support structures include a mounting bar securable directly to a light bulb or other structure in a lighting system such as a sign box wall. An expandable support bracket is also provided for supporting one or more light emitting diode modules. A method of retrofitting a lighting system to use a light emitting diode module is also provided.

24 Claims, 9 Drawing Sheets

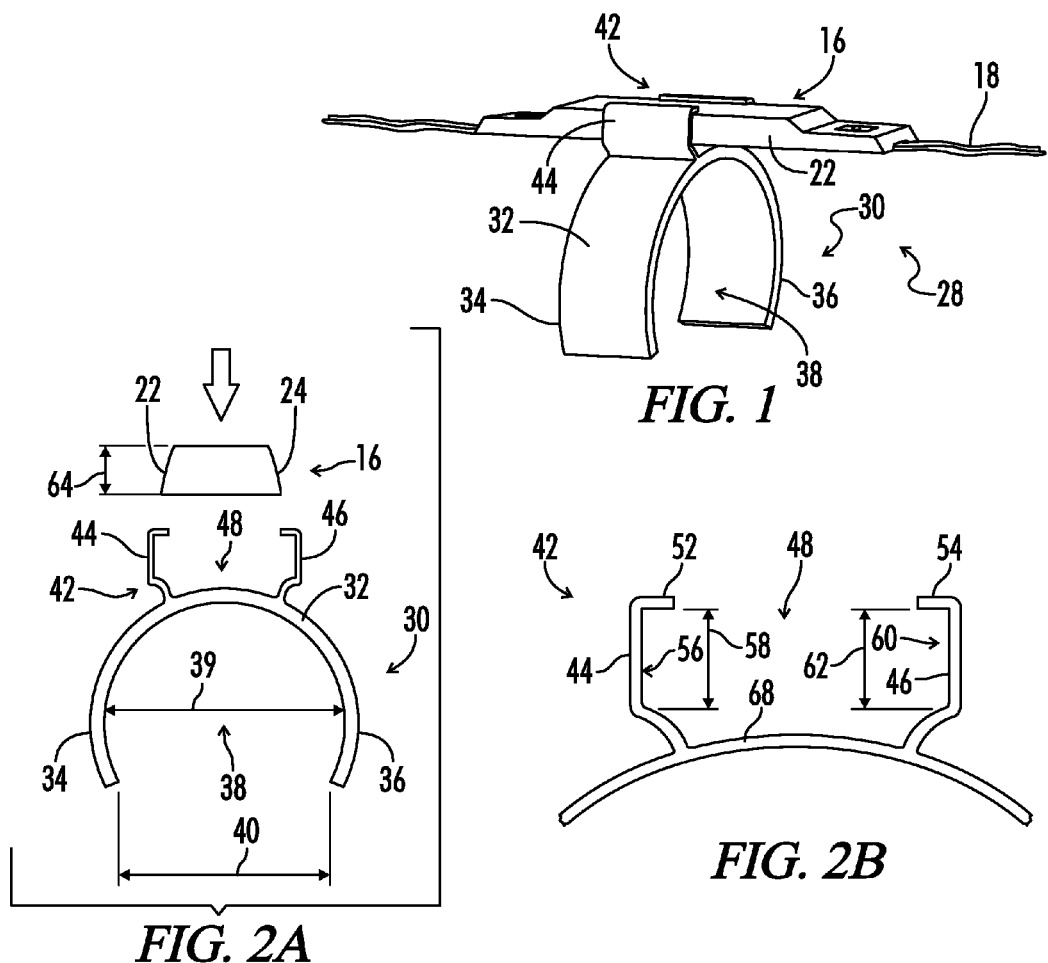
*FIG. 1*
*FIG. 2A*
*FIG. 2B*
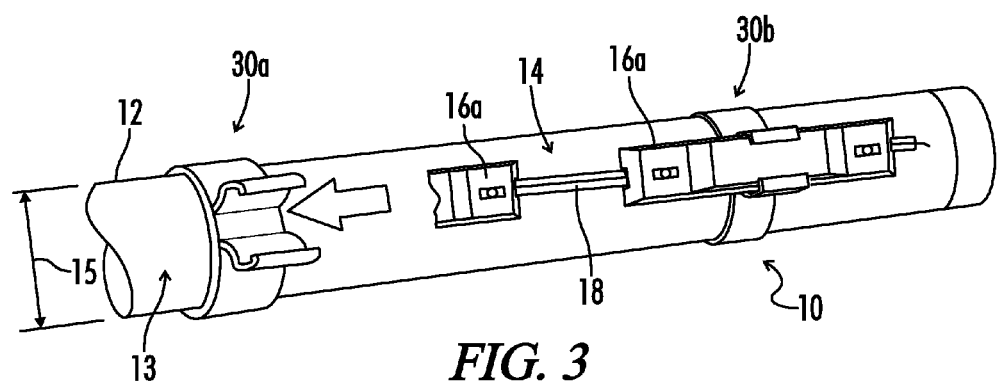
*FIG. 3*

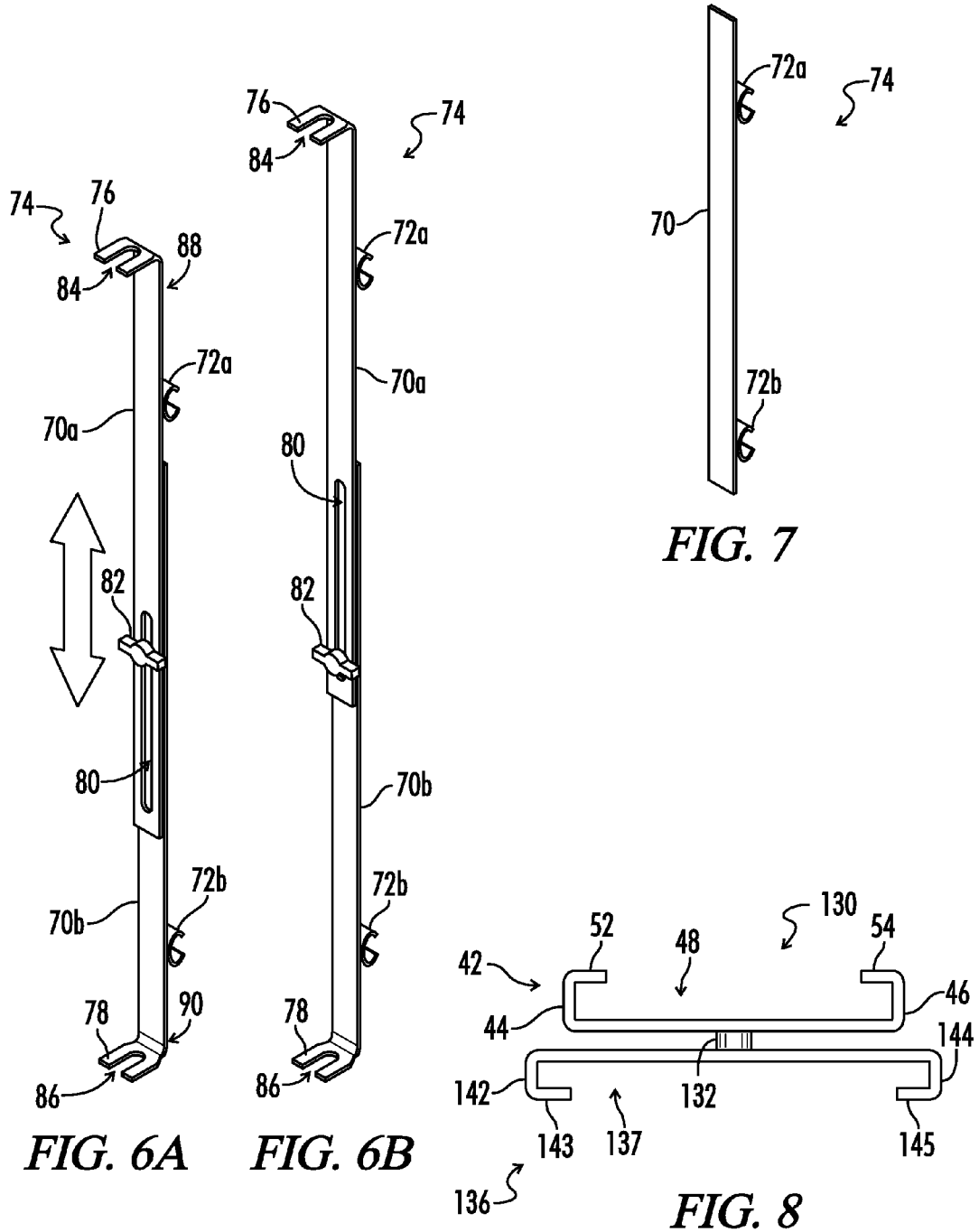

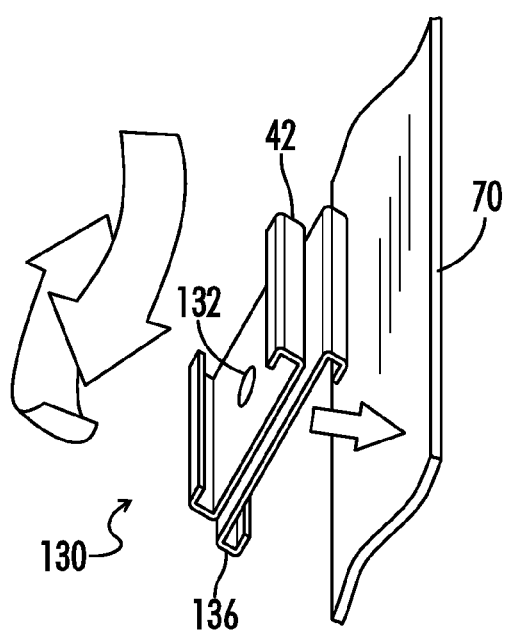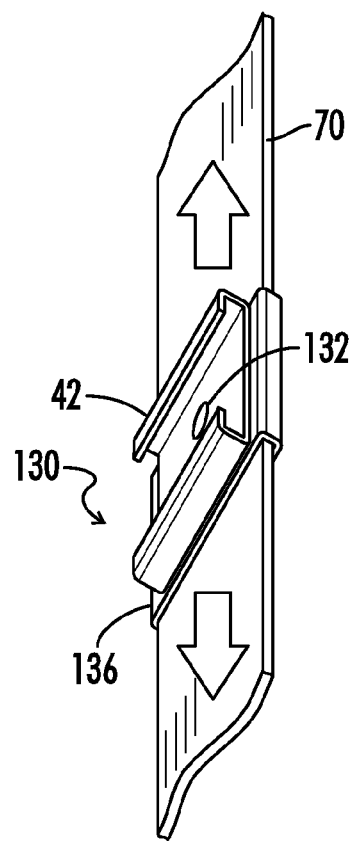
FIG. 10
FIG. 11

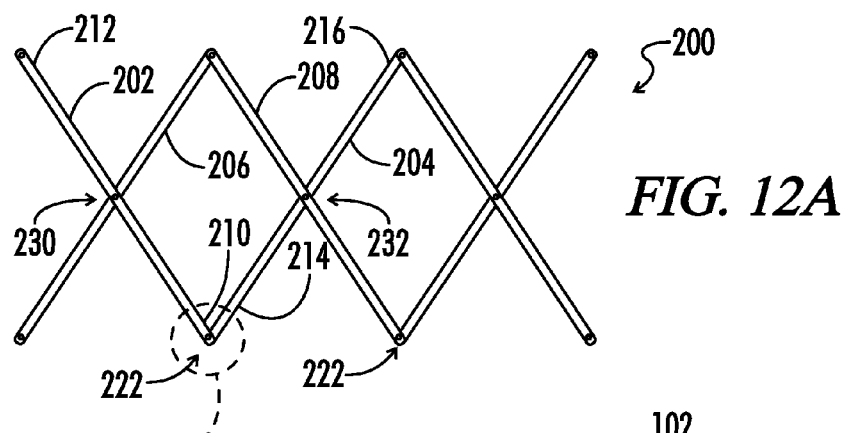
*FIG. 12A*
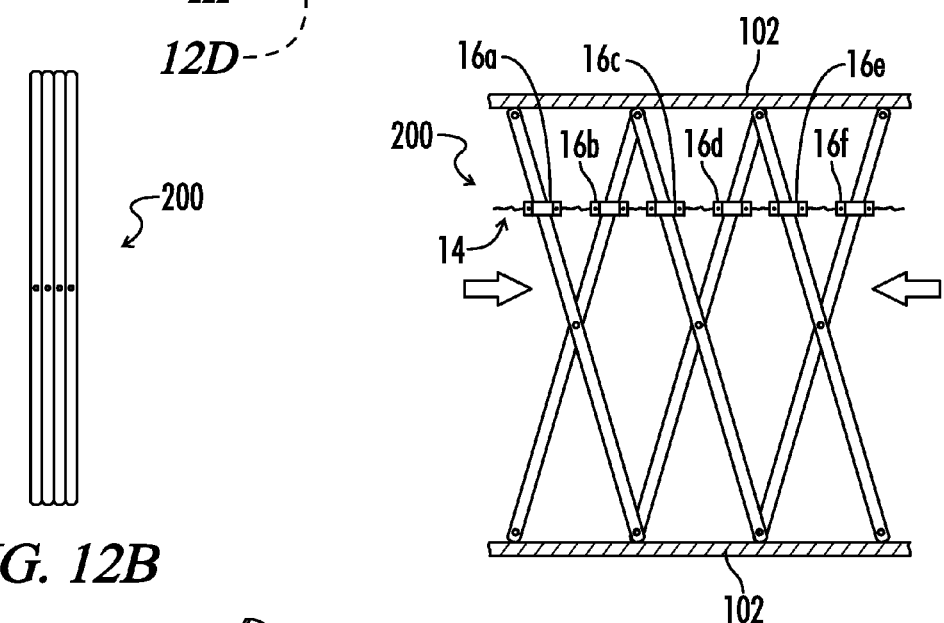
*FIG. 12B*
*FIG. 12C*
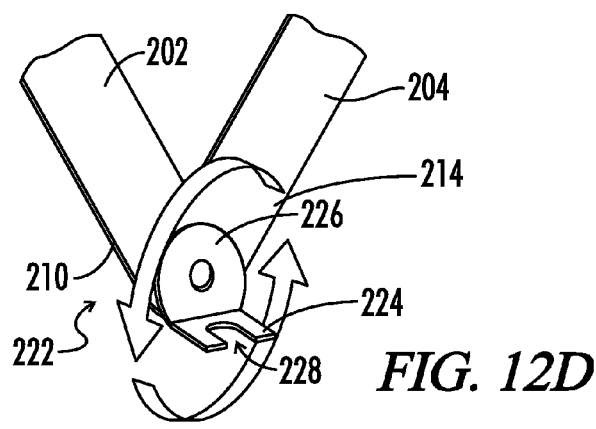
*FIG. 12D*

MOUNTING APPARATUS FOR A LIGHT EMITTING DIODE MODULE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND OF THE INVENTION

The present invention relates generally to devices and methods for installing lighting systems and more particularly to devices and methods for retrofitting conventional fluorescent, neon or incandescent lighting systems with light emitting diode modules and/or light emitting diode string lights.

Many conventional lighting systems typically include a fluorescent, neon or incandescent bulb connected to an electrical power supply or driver circuit. Such conventional lighting systems are commonly found in overhead or ground-level lighting applications, in buildings and vehicles, and in display applications such as commercial signs and billboards. In some applications, conventional lighting systems of this nature include a housing and one or more elongated light bulbs positioned within the housing. Such lighting systems can be used for area lighting or for backlighting. For example, in sign and billboard applications, one or more of the housing walls typically includes a translucent or transparent panel. Light passes from an interior light bulb through the panel to the exterior of the housing and renders indicia included on the panel viewable by observers. Such a panel can include text, a logo, a color pattern or some other markings intended for illumination.

Conventional lighting systems of this type present numerous problems. For example, traditional light bulbs commonly used in such lighting systems must be frequently replaced. Such replacement requires a worker to travel to the sign location, manually remove the existing bulb and manually install a replacement bulb. Additionally, because lighting systems are typically elevated, the worker is often forced to scale a ladder or other structure to access the sign housing, further exposing the worker to potential danger and further complicating the bulb replacement process.

Another problem associated with conventional lighting systems is the inefficient power usage of conventional light bulbs. Such bulbs consume significantly more power than newer alternatives such as light emitting diodes.

Others have attempted to solve the problems associated with conventional fluorescent and incandescent signs and lighting fixtures by providing hardware to retrofit existing signs and lighting fixtures to receive lighting assemblies that include light emitting diodes.

For example, U.S. Pat. No. 7,510,299 to Timmermans et al. teaches an LED lighting device for replacing fluorescent tubes. However, conventional bulb replacement or retrofitting systems generally require the existing bulbs to be removed from the light housing, further complicating bulb replacement, adding additional expense and creating waste.

What is needed, then, is an improved lighting system and mounting hardware and associated methods for installing light emitting diode modules in a conventional lighting system.

BRIEF SUMMARY OF THE INVENTION

One embodiment of the present invention provides a bulb bracket apparatus for mechanically attaching a light emitting diode module to a light bulb. The bulb bracket apparatus includes a module clip and a bulb clip. The module clip has first and second module clip arms. A concave module clip cavity shaped to receive the light emitting diode is defined between the first and second module clip arms. The bulb clip extends away from the module clip and includes first and second bulb clip arms. A concave bulb clip cavity shaped to receive the light bulb is defined between the first and second bulb clip arms.

Another embodiment of the present invention provides an integrated light emitting diode module bracket assembly for attachment to a light bulb. The light emitting diode module apparatus has a module cover and a module base. The module base engages the module cover. The module base includes an integral bulb bracket. The integral bulb bracket includes a first base clip arm integrally formed on the module base and extending away from the module base. A second base clip arm is integrally formed on the module base and extends away from the module base. A concave base clip cavity shaped to receive the light bulb is defined between the first and second base clip arms.

A further embodiment of the present invention provides a mounting bracket assembly for attachment to a light bulb. The mounting bracket assembly includes a light bulb and a bulb clip having first and second bulb clip arms defining a concave bulb clip cavity. The light bulb is received in the bulb clip cavity. The first and second bulb clip arms resiliently engage the light bulb. In some embodiments, a light emitting diode module is attached to the bulb clip using an adhesive or a mechanical module fastener attached to the bulb clip. The mechanical module fastener can include a module clip integrally formed on the bulb clip or a separate mechanical module fastener disposed between the bulb clip and the light emitting diode module.

An additional embodiment of the present invention provides an apparatus for supporting a light emitting diode module on a light bulb. The apparatus includes a first mounting bar. A first bulb support is disposed on the first mounting bar. The first bulb support includes first and second bulb support arms. A concave bulb support cavity shaped for receiving the light bulb is defined between the first and second bulb support arms. The first and second bulb support arms resiliently clamp the light bulb when the light bulb is received in the bulb support cavity.

A further embodiment of the present invention provides a support apparatus for attaching a light emitting diode module to a light mount. The support apparatus includes a first mounting bar having first and second mounting bar ends and a second mounting bar having third and fourth mounting bar ends. The first mounting bar end is pivotally attached to the third mounting bar end at a pivoting bar joint. A joint bracket is pivotally attached to the first and second mounting bars at the pivoting bar joint. A mounting flange protrudes substantially perpendicularly from the joint bracket.

Yet another embodiment of the present invention provides a lighting system including a sign box and a fluorescent light bulb disposed in the sign box. The fluorescent light bulb has exterior bulb surface, and a light emitting diode module is mechanically attached to the exterior bulb surface of the fluorescent light bulb.

Another embodiment of the present invention provides a method of retrofitting an existing lighting system to include a light emitting diode module mounted on a light bulb. The method includes the steps of: (a) providing a lighting system including a light bulb; (b) clipping a bulb clip onto the light bulb, the bulb clip including a bulb bracket receiving the light bulb and a module bracket shaped for receiving a light emitting diode module; and (c) attaching a light emitting diode module to the module bracket.

Numerous other objects, features and advantages of the present invention will be readily apparent to those skilled in the art upon a reading of the following disclosure when taken in conjunction with the accompanying drawings.

BRIEF DESCRIPTION OF THE SEVERAL VIEWS OF THE DRAWINGS

FIG. 1 illustrates a perspective view of an embodiment of bulb bracket and an LED module in accordance with the present invention.

FIG. 2A illustrates an exploded end view of the embodiment of the LED module and bulb bracket assembly of FIG. 1.

FIG. 2B illustrates a detail cross-sectional view of an embodiment of an LED module clip in accordance with the present invention.

FIG. 3 illustrates a partial perspective view of an embodiment of a retrofit LED lighting system in accordance with the present invention.

FIG. 6A illustrates a perspective view of an embodiment of an LED module mounting bar apparatus in accordance with the present invention.

FIG. 6B illustrates a perspective view of the embodiment of the LED module mounting bar apparatus of FIG. 6B in a longitudinally extended position.

FIG. 7 illustrates a perspective view of an embodiment of an LED module mounting bar apparatus in accordance with the present invention.

FIG. 8 illustrates an end view of an embodiment of a bar bracket for mounting a LED module to a LED module mounting bar apparatus in accordance with the present invention.

FIG. 10 illustrates a detail exploded perspective view of an embodiment of a bar bracket positioned for attachment to an LED module mounting bar apparatus in accordance with the present invention.

FIG. 11 illustrates a detail perspective view of the bar bracket of FIG. 10 mounted onto a LED module mounting bar apparatus.

FIG. 12A illustrates an elevation view of an LED support apparatus in an expanded position in accordance with the present invention.

FIG. 12B illustrates an elevation view of the LED support apparatus of FIG. 12A in a closed position.

FIG. 12C illustrates an elevation view of the LED support apparatus of FIG. 12A mounted in a sign box in a partially expanded position.

FIG. 12D illustrates a detail perspective view of a pivoting rod joint of the LED support apparatus of FIG. 12A.

DETAILED DESCRIPTION OF THE INVENTION

Figure 4A:
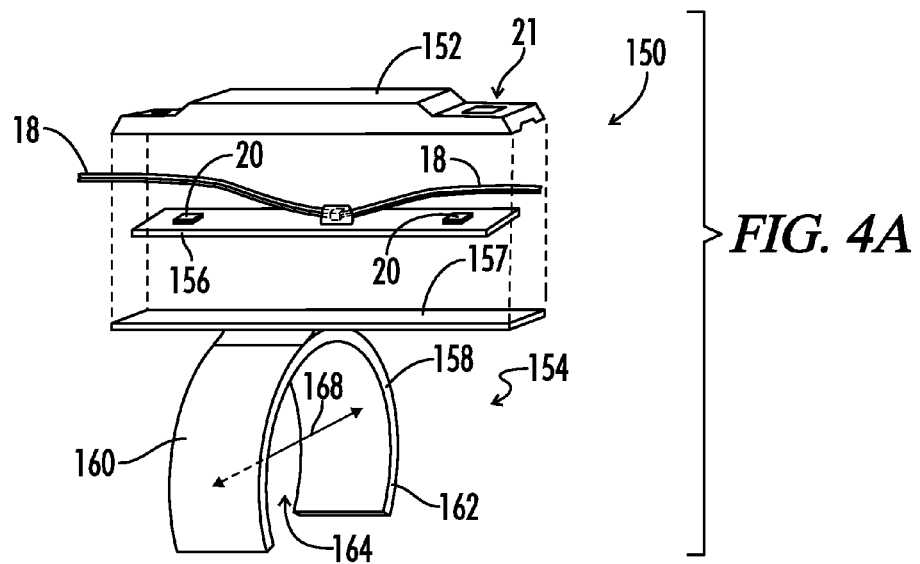
FIG. 4A illustrates an exploded perspective view of an embodiment of an integral LED module bracket assembly in accordance with the present invention.

Referring now to the drawings, FIG. 1 illustrates an embodiment of a light emitting diode module 16 attached to a bulb bracket 30. Bulb bracket 30 can also be referred to as a bulb bracket apparatus or mounting apparatus for mechanically attaching a light emitting diode module, such as those found in light emitting diode string lights, to a light bulb.

Light emitting diode module (LED module) 16 generally includes a structure having at least one light emitting diode (LED). LED module 16 can include one individual module in a light emitting diode string light (LED string light). An LED string light, or an LED string light engine, generally includes a plurality of LED modules mechanically and electrically interconnected by one or more flexible and electrically conductive wires. Such LED string lights are known in the art for numerous applications, including residential and industrial lighting systems, for use in buildings, in automobiles, in outdoor applications, in illuminated signs, and in numerous other applications requiring illumination.

In many of these applications where LED modules can be used, it may be desirable to mechanically mount one or more LED modules onto the exterior of a light bulb in an existing lighting system so that the light bulb provides a structure for supporting the LED module within the existing lighting system.

In some embodiments, LED module 16 is detachably securable to bulb bracket 30. As seen in FIG. 2A, in some embodiments, an LED module 16 can be pressed against a bulb bracket 30 such that LED module 16 engages an LED module clip 42 positioned on bulb bracket 30. LED module clip 42, also seen in FIG. 2B, includes a first module clip arm 44 and a second module clip arm 46. First and second module clip arms 44, 46 are connected by a bridge 68, as best seen in FIG. 2B. LED module clip 42 generally defines a module clip cavity 48 having a concave shape and defining a module clip opening through which an LED module 16 can be inserted into the module clip cavity 48. First module clip arm 44 includes a first clip arm flange 52, and second module clip arm 46 includes a second clip arm flange 54. Each clip arm flange 52, 54 protrudes toward the module clip cavity 48. First and second clip arm flanges 52, 54 generally define the module clip opening. Each clip arm flange 52, 54 forms a retaining structure that engages LED module 16 to retain LED module 16 in module clip cavity 48. When LED module 16 is positioned in module clip cavity 48, first module clip arm 44 resiliently flexes and engages first module side 22. In some embodiments, second module clip arm 46 also resiliently flexes and engages second module side 24.

Also seen in FIG. 2B, first module clip arm 44 defines a first clip arm channel 56 shaped to engage first module side 22. LED module 16 includes an LED module height 64. First module clip arm 44 defines a first clip arm channel height 58 dimensioned to correspond to the local LED module height 64 at the desired attachment location on the LED module 16. Similarly, second module clip arm 46 defines a second clip arm channel 60 shaped to engage second module side 24. Second module clip arm 46 defines a second clip arm channel height 62 dimensioned to correspond to the local LED module height 64 at the desired attachment location on the LED module 16.

Referring again to FIG. 1, bulb bracket 30 includes a bulb clip 32 shaped to be clipped onto a light bulb. Bulb bracket 30 is adapted to engage numerous types of light bulbs, including fluorescent, incandescent, neon or other types of bulbs known in the art. During use, bulb bracket 30 can be clipped directly to a light bulb in an existing lighting system for mounting an LED module to the bulb.

As seen in FIG. 3, multiple bulb brackets 30a, 30b can be attached to a single light bulb 12. A first LED module 16a of an LED string light 14 can be attached to first bulb bracket 30a, and a second LED module 16b of the same string light 14 can be attached to second bulb bracket 30b, forming an embodiment of an LED lighting system 10. In other embodiments, LED lighting modules of different LED string lights can be attached to a single light bulb 12.

Referring again to FIG. 1 and FIG. 2A, bulb bracket 30 includes a bulb clip 32 extending away from the module clip 42. The bulb clip 32 includes a first bulb clip arm 34 and a second bulb clip arm 36 defining a concave bulb clip cavity 38 shaped to receive a light bulb. The first bulb clip arm 34 extends away from the LED module clip 42 and includes a concave shape substantially facing the bulb clip cavity 38. The second bulb clip arm 36 extends away from the LED module clip 42 and also includes a concave shape substantially facing the bulb clip cavity 38. Each bulb clip arm 34, 36 can be formed of a resilient material, and each bulb clip arm 34, 36 resiliently engages a light bulb when the light bulb is positioned in the bulb clip cavity 38. In some embodiments, first and second bulb clip arms 34, 36 can each include a textured surface to prevent sliding contact between a bulb disposed in bulb clip cavity 38 and bulb clip 32. In other embodiments, one or both bulb clip arms 34, 36 may be coated with a non-slip surface material such as a rubber, a polymer or an adhesive to prevent sliding contact between a bulb disposed in bulb clip cavity 38 and bulb clip 32.

As seen in FIG. 2A, first and second bulb clip arms 34, 36 define a bulb clip cavity opening. The bulb clip cavity opening has a bulb clip cavity opening spacing 40. In some embodiments, the bulb clip cavity opening spacing 40 is smaller than the diameter 15 of a light bulb 12 intended to be received in bulb clip cavity 38 through the bulb clip cavity opening. As such, first and second bulb clip arms 34, 36 resiliently flex when a light bulb is inserted through bulb clip opening into bulb clip cavity 38.

In further embodiments, a bulb clip can be integrally formed on LED module 16. Referring to FIG. 4A, in some embodiments, an integrated light emitting diode module clip apparatus 150 for attachment to a light bulb includes a module cover 152 and a module base 154. The module base 154 engages the module cover to form a housing. In some embodiments, a circuit board 156 is disposed in the housing between the module cover 152 and the module base 154. One or more LEDs 20 can be disposed on the circuit board 156. In some embodiments, module cover 152 includes a window 21 aligned with an LED 20 for transmission of light emitted by the LED to the exterior of the housing.

In some embodiments, module base 154 includes a base platform 157 and an integral bulb bracket 158 extending downward from the base platform 157. Integral bulb bracket 158 can be integrally molded with base platform 157 in some embodiments. Integral bulb bracket 158 can have a first base clip arm 160 integrally formed on, and extending away from, the base platform 157. A second base clip arm 162 is also integrally formed on the base platform 157 in some embodiments and extends away from the base platform 157. The first and second base clip arms 160, 162 define a base clip cavity 164 shaped for receiving a light bulb such as a fluorescent, neon or incandescent bulb. Integral bulb bracket 158 defines a base clip inner diameter 168 between first and second base clip arms 160, 162. The initial base clip inner diameter 168 may be smaller than the diameter of a light bulb intended to be received in the base clip cavity 164. In some embodiments, the first and second base clip arms 162, 164 resiliently flex and apply a radial clamping force against a light bulb when the light bulb is received in the base clip cavity 164, and the base clip inner diameter 168 may increase to match the outer diameter 15 of the light bulb 12.

Base platform 157 in some applications can provide a platform for directly attaching a separate LED module. For example, in some embodiments an LED module can include an adhesive backing. In such embodiments, a module base 154 can be secured to a light bulb, and the adhesive backing on the LED module can be secured directly to base platform 157.

Figure 4B:
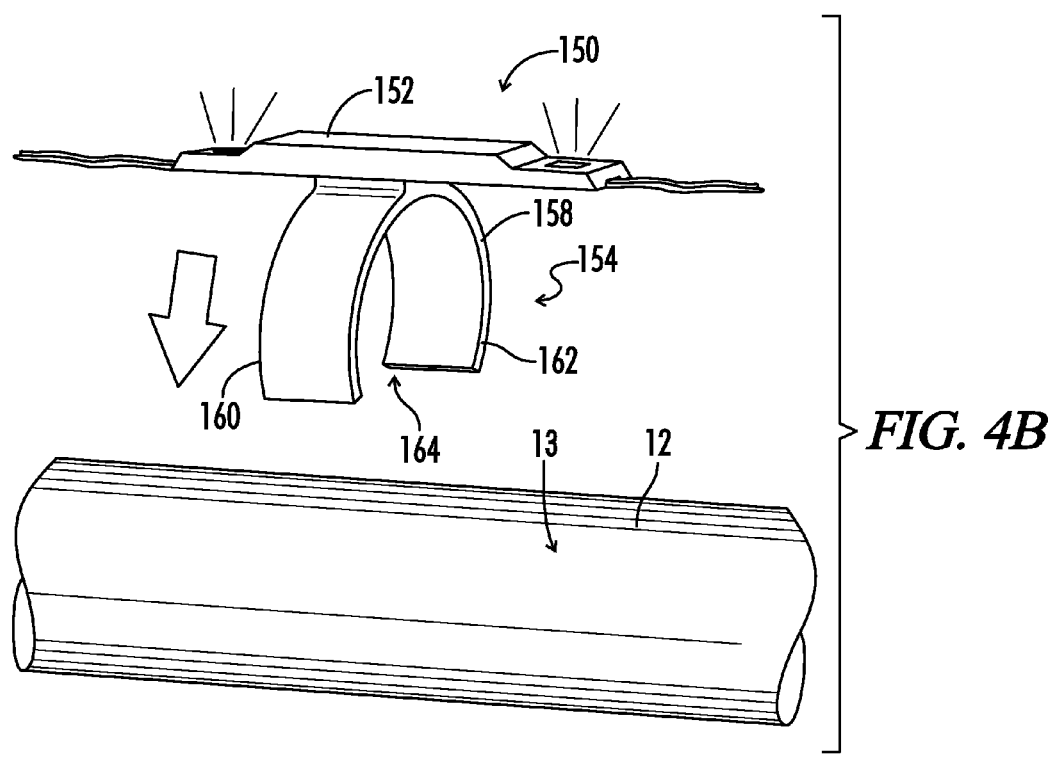
FIG. 4B illustrates a perspective view of the integral LED module bracket assembly of FIG. 4A positioned for attachment to a bulb.
Figure 5:
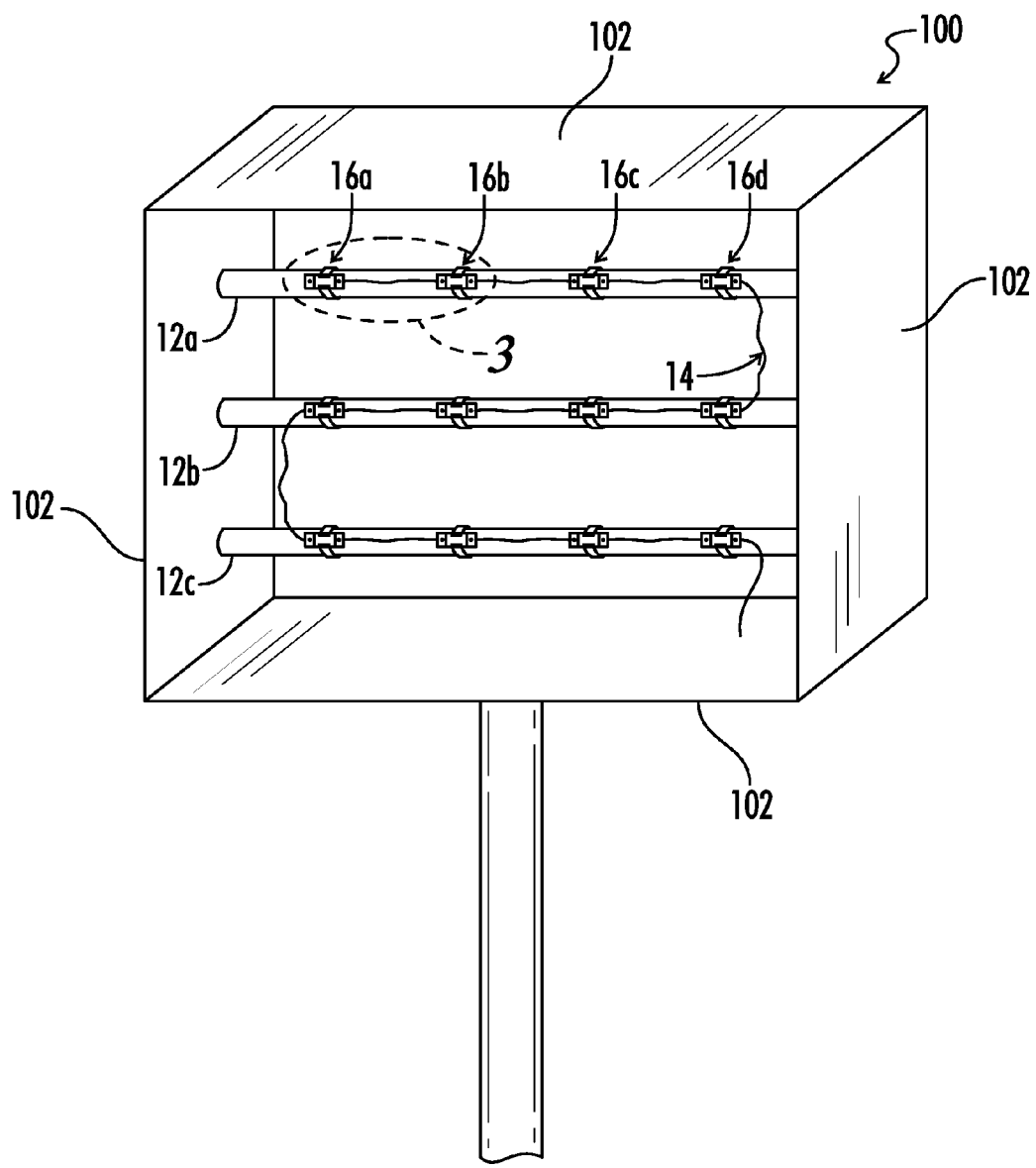
FIG. 5 illustrates a perspective view of an embodiment of an LED string light installed on a plurality of bulbs in a sign box in accordance with the present invention.

Referring now to FIG. 5, in some embodiments, a sign 100 includes a sign box 102. A plurality of conventional bulbs 12a, 12b, etc. can be arranged in the sign box 102. In many applications, it may be desirable to retrofit a sign 100 to provide illumination using light emitting diodes instead of the conventional bulbs 12a, 12b, etc. In such applications, a bulb clip in accordance with the present invention provides an apparatus for retrofitting the sign 100 to operate using one or more light emitting diode modules 16a, 16b, etc. without removing the existing bulbs 12a, 12b, etc. The light emitting diode modules 16a, 16b, etc. can form a light emitting diode string light 14. During use, a user can open sign box 102 and position one or more bulb brackets, or bulb clips, onto one or more of the light bulbs arranged in sign box 102. An LED module can then be mechanically attached to each bulb bracket or bulb clip. In embodiments including an integral bulb bracket formed on the LED module, the LED module with integral bulb bracket can be clipped directly onto an existing light bulb, as seen in FIG. 4B. The bulb bracket can be attached to the exterior bulb surface 13 of light bulb 12.

In some applications, it may be desirable to view an illuminated sign from both sides. In such applications, multiple light emitting diode modules can be mounted on an existing light bulb facing in opposite directions to provide bidirectional illumination such that the sign may be illuminated and visible from both sides.

It is further understood that, in some embodiments, an LED lighting system in accordance with the present invention may include one or more LED modules mechanically mounted to the exterior of a light bulb in an existing conventional lighting system and can operate with the conventional light bulb being turned off or being inoperable for the purpose of providing illumination. In such embodiments, the inoperable nature of the existing light bulb does not interfere with the ability of the existing light bulb to provide a support structure for mounting an LED module using a bulb bracket. Additionally, it will be readily appreciated by those of skill in the art that, in other embodiments, an LED lighting system in accordance with the present invention and including one or more LED modules mechanically mounted to the exterior of a light bulb in an existing conventional lighting system can operate to provide dual-mode simultaneous or sequential illumination with a functioning light bulb.

In some applications, an existing lighting system such as a sign 100 or other lighting fixture may not be suitable for mechanical attachment of LED modules to the existing bulbs. For example, the existing bulbs may be removed or broken. Additionally, the existing bulbs may be placed at inadequate spacing intervals for the desired LED illumination pattern. In some embodiments, the present invention provides an LED module mounting apparatus including a mounting bar. The mounting bar can be attached to an existing lighting system, and one or more LED modules, such as those found in an LED string light, can then be mechanically attached to the mounting bar.

Referring now to FIGS. 6A-7, in some embodiments, the present invention provides an LED module mounting apparatus 74 including a mounting bar 70. The mounting bar 70 is generally operable to receive an LED module 16 either directly or by way of an intermediate bar bracket 130, illustrated in one embodiment in FIG. 8.

Figure 9:
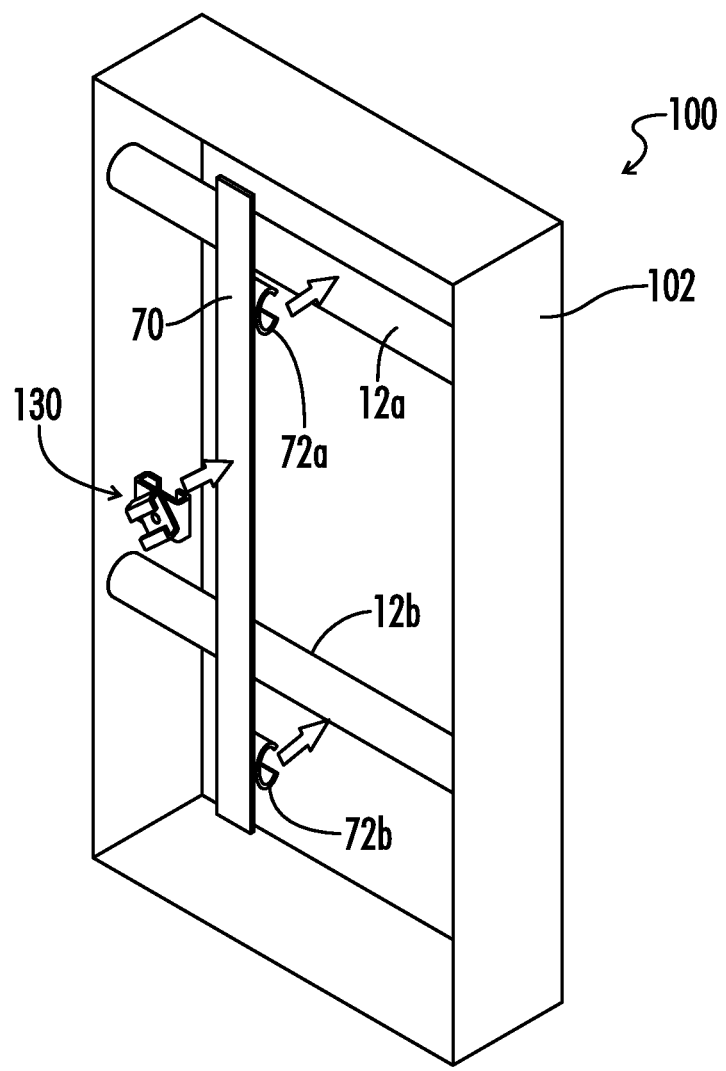
FIG. 9 illustrates a partially exploded perspective view of an LED module mounting bar apparatus and a bar bracket positioned for attachment to the LED module mounting bar apparatus.

As seen in FIG. 7, in some embodiments, the LED module mounting apparatus 74 includes a mounting bar 70. In some embodiments, mounting bar 70 can be mechanically attached directly to an existing light bulb in a conventional lighting system. For example, as illustrated in FIG. 9, a conventional lighting system includes a sign 100. Sign 100 houses first and second light bulbs 12a, 12b in the sign box 102. Each light bulb 12a, 12b can be a fluorescent, neon, incandescent or other type of conventional bulb and can be operable or inoperable for providing illumination. Mounting bar 70 can be mechanically secured directly to one or more light bulbs 12a, 12b using one or more bar supports 72a, 72b. For example, a first bar support 72a can extend from mounting bar 70 and clip onto first light bulb 12a, and a second bar support 72b can extend from mounting bar 70 and clip onto second light bulb 12b. First bar support 72a includes first and second bar support arms defining a first concave bar support cavity shaped for receiving the light bulb. Similarly, second bar support 72b includes third and fourth bar support arms defining a second concave bar support cavity shaped for receiving the light bulb.

As seen in FIG. 9, a bar bracket 130 can be attached to mounting bar 70. Bar bracket 130 is generally operable to receive an LED module and secure the module to the mounting bar 70. As seen in FIG. 8, an embodiment of bar bracket 130 has a bar clip 136 and an LED module clip 42. Bar clip 136 has a first bar clip arm 142 and a second bar clip arm 144. Each bar clip arm 142, 144 extends generally away from the LED module clip 42. A first bar clip flange 143 extends from the first bar clip arm 142, and a second bar clip flange 145 extends from the second bar clip arm 144. Each bar clip flange 143, 145 generally extends toward a concave bar clip cavity 137 shaped to receive mounting bar 70. During use, each bar clip flange 143, 145 can resiliently clamp against mounting bar 70. As seen in FIG. 10, bar bracket 130 can be clipped directly to mounting bar 70. As illustrated in FIG. 11, after bar clip 130 is attached to mounting bar 70, in some embodiments, bar bracket 130 can be moved longitudinally along mounting bar 70 to adjust the position of an LED module received in LED module clip 42.

Referring again to FIG. 8, LED module clip 42 includes first and second module clip arms 44, 46 and first and second module clip arm flanges 52, 54, respectively. LED module clip 42 defines a concave module clip cavity 48 shaped to receive an LED module. LED module clip 42 is pivotally attached to bar clip 136 at a pivoting clip joint 132 in some embodiments. Pivoting clip joint 132 allows an LED module received in module clip cavity 48 to be oriented in various angular positions relative to mounting bar 70 as indicated by arrows in FIG. 10. Module clip 42 can be angularly positioned relative to bar clip 136 before and/or after bar bracket 130 is attached to mounting bar 70.

In some applications, existing light bulbs in a conventional lighting system may not be aligned with the bar support locations on LED mounting apparatus 74. As seen in FIGS. 6A and 6B, to overcome this problem, LED mounting apparatus 74 can be longitudinally extendable or retractable. In some embodiments, LED mounting apparatus 74 can include a first mounting bar 70a and a second mounting bar 70b. A bar travel slot 80 can be defined in first mounting bar 70a. A bar fastener 82 can extend from second mounting bar 74b through bar travel slot 80. In this embodiment, first mounting bar 70a can be longitudinally repositioned relative to second mounting bar 70b. Additionally, in some embodiments, first mounting bar 70a can also be angularly repositioned relative to second mounting bar 70b about bar fastener 82. By adjusting the longitudinal and/or angular position of first and second mounting bars 70a, 70b, first and second bar supports 72a, 72b can be correspondingly repositioned to align with one or more light bulbs in an existing conventional lighting system such as a sign box or an existing lighting fixture.

Figure 13:
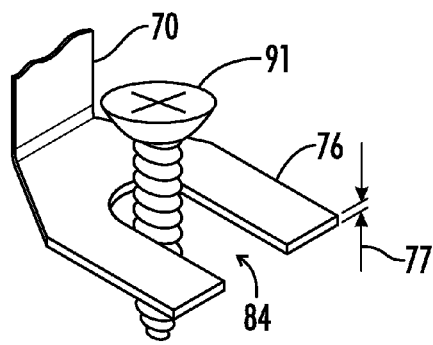
FIG. 13 illustrates a detail perspective view of a bar flange in accordance with the present invention.

In some applications, attachment of an LED mounting apparatus 74 including a mounting bar 70 directly to one or more light bulbs in an existing lighting system may not be possible because the light bulbs are damaged, missing or improperly positioned for a desired LED illumination pattern. In such instances, an LED mounting apparatus 74 can include one or more bar flanges for attachment directly to a sign box 102 or to another suitable structure in the existing lighting system. For example, FIG. 6A illustrates an LED mounting apparatus 74 including a mounting bar 70a having a first bar flange 76 extending therefrom. First bar flange 76 can have an integral region of first mounting bar 70a that is bent away from the mounting bar. In other embodiments, first bar flange 76 can include a separate flange piece attached to the mounting bar. A first bar flange opening 84 is defined in the first bar flange 76 in some embodiments. An insert fastener 91 can be inserted in first bar flange opening 84 to secure LED mounting apparatus 74 to a structure in a lighting system such as a sign box wall, as seen in FIG. 13.

Figure 14:
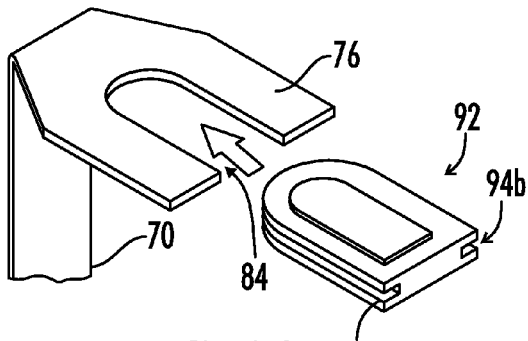
FIG. 14 illustrates a partial exploded detail perspective view of an embodiment of a bar flange with a flange insert in accordance with the present invention.

Referring now to FIG. 14, in some embodiments, a flange insert 92 can be positioned in either first or second bar flange opening 84, 86. Flange insert 92 can include one or more insert channels 94a, 94b defined in flange insert 92. Each insert channel is shaped to slidingly engage an edge of first or second bar flange 76, 78. As seen in FIG. 13, each bar flange has a bar flange thickness 77. The bar flange thickness 77 adjacent a bar flange opening 84 is generally at least as large as the insert channel height 97, seen in FIG. 16. Insert channel height 97 in some embodiments is less than bar flange thickness 77 adjacent bar flange opening 84 such that an interference fit is established between each insert channel 94a, 94b and bar flange 76 when insert flange 92 is received in bar flange opening 84.

Figure 16:
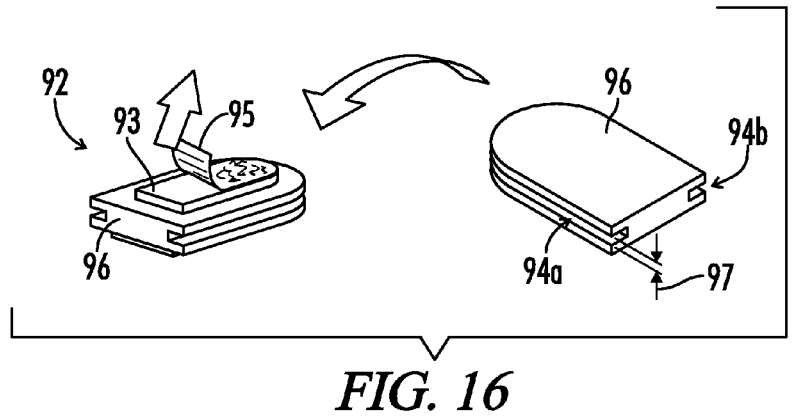
FIG. 16 illustrates an embodiment of a flange insert with an adhesive layer in accordance with the present invention.

During use, flange insert 92 can be secured to a structure on a lighting system, such as a sign box wall, prior to installation of mounting bar 70. After flange insert 92 is secured to the lighting system structure, a bar flange can be installed onto flange insert 92 by aligning a bar flange with first and second insert channels 94a, 94b and receiving flange insert 92 in a bar flange opening. As seen in FIG. 16, in some embodiments, flange insert 92 may have an adhesive layer 93 positioned on insert body 96. Adhesive layer 93 can be used to adhesively secure flange insert 92 to a structure on a lighting system. Insert 92 can be provided with a peelable layer 95 covering adhesive layer 93. A user can manually remove peelable layer 95 prior to applying insert 92 onto a surface.

Figure 15A:
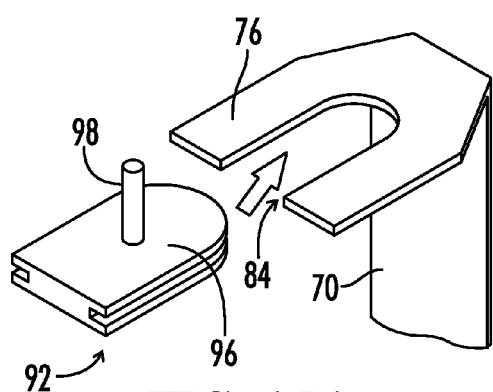
FIG. 15A illustrates a partial exploded detail perspective view of an embodiment of a bar flange with a flange insert in accordance with the present invention.
Figure 15B:
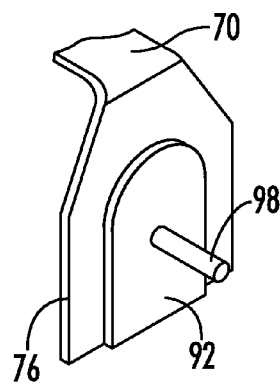
FIG. 15B illustrates a partial detail perspective view of the embodiment of a bar flange receiving a flange insert of FIG. 14.

Referring now to FIGS. 15A and 15B, in some embodiments, flange insert 92 includes an insert post 98 protruding from flange insert body 96. Flange insert 92 including post 98 can be inserted into a bar flange opening 84, seen in FIG. 15A such that insert post 98 extends away from mounting bar 70, as seen in FIG. 15B. Insert post 98 can be shaped in some embodiments to engage a lighting fixture socket used to mechanically mount a conventional light bulb such as a fluorescent, neon or incandescent bulb. Insert post 98 can be received in a light bulb socket in some embodiments for mechanically supporting mounting bar 70 using one or more existing bulb sockets found in an existing lighting system. In some applications, insert post 98 is positioned in a light bulb socket prior to inserting flange insert 92 into bar flange socket 84. In other applications, it is possible to position flange insert 92 into bar flange socket 84 before inserting post 98 into bar flange opening 84. A flange insert 92 including a post 98 can be disposed on each end of mounting bar 70 in some embodiments. It will be readily appreciated by those of skill in the art that various combinations of different types of flange inserts can be used on a single mounting bar, including flange inserts with adhesive layers as seen in FIG. 16 and flange inserts with insert posts as seen in FIG. 15A and FIG. 15B. In addition, in some embodiments, a flange insert can be disposed in one end of mounting bar 70, and a flange fastener such as that seen in FIG. 13 can be disposed in the opposite end of mounting bar 70.

Referring now to FIG. 12A, in some embodiments, an expandable support bracket 200 can be mounted in an existing lighting system such as a sign box or a lighting fixture to support one or more LED modules. Expandable bracket 200 includes a first bracket rod 202 pivotally attached to a second bracket rod 204 at a pivoting rod joint 222. First bracket rod 202 has a first rod end 210 and a second rod end 212. Second bracket rod 204 has a third rod end 214 and a fourth rod end 216. Pivoting rod joint 222 is generally disposed between first rod end 210 and third rod end 213, as seen in FIG. 12D. A third bracket rod 206 is pivotally attached to first bracket rod 202 at a first intermediate pivoting joint 230 positioned between first and second rod ends 210, 212. A fourth bracket rod 208 is also pivotally attached to third bracket rod 206 at a distal end of third bracket rod 208. Fourth bracket rod 208 is also pivotally attached to second bracket rod 204 at a second intermediate pivoting joint 232 positioned between third and fourth rod ends 214, 216, forming an accordion-style expandable support bracket 200 for supporting one or more LED modules. As seen in FIG. 12B, expandable bracket support 200 may be adjusted to a closed position for transport or storage.

As seen in FIG. 12D, a rod flange 224 extends from a pivoting rod joint 222 in some embodiments. Rod flange 224 includes a flange base 226 pivotally attached to first and second rods 202, 204 at pivoting rod joint 222 so that rod flange 224 can assume various angular orientations relative to first and second bracket rods 202, 204. Additionally, rod flange 224 can have a rod flange opening 228 shaped for receiving a rod flange fastener such a screw or bolt. Alternatively, rod flange opening 228 can receive an insert 92, such as those illustrated in various embodiments in FIGS. 14-16.

The expandable bracket support 200 can be secured to a structure in an existing lighting system using rod flange 224. For example, each rod flange 224 can be secured to a wall of a sign box 102, as illustrated in FIG. 12C. Also, one or more LED modules 16a, 16b, etc. can be mechanically attached to expandable bracket support 200 to form an illumination pattern. In some embodiments, each LED module belongs to one or more LED string lights 14. Each LED module can be attached to a rod on expandable bracket support 200 using a bar bracket 130, as illustrated in FIG. 8. In other embodiments, one or more LED modules can be attached directly to a bracket rod using an adhesive or other suitable mechanical attachment means. Further, each LED module can be positioned longitudinally along its corresponding rod bracket when a bar bracket 130 is used, as illustrated generally in FIG. 11.

Figure 17A:
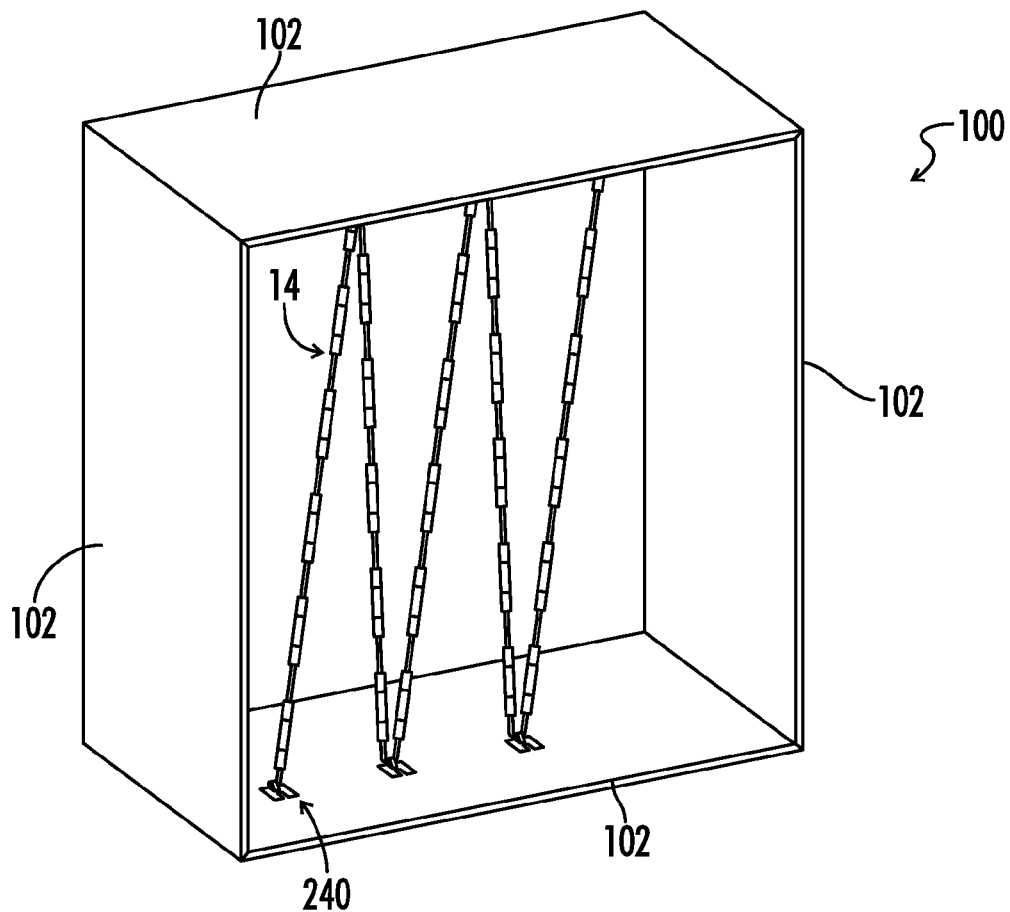
FIG. 17A illustrates a perspective view of an embodiment of a lighting system using a string light hook in accordance with the present invention.
Figure 17B:
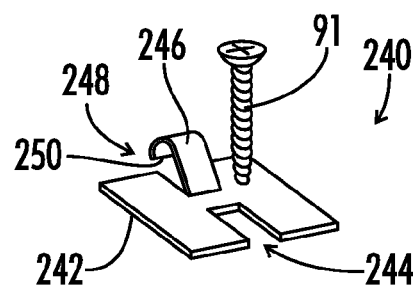
FIG. 17B illustrates a detail perspective view of a string light hook of FIG. 17A.

Referring now to FIG. 17A, in some embodiments an LED string light 14 can be installed in a conventional lighting system such as a sign 100 including one or more sign box walls 102 using one or more string light hooks 240. Each string light hook includes a hook base 242, seen in FIG. 17B. A hook base opening 244 may be defined in a hook base 242, and a fastener 91 can be used to secure hook base 242 to a structure on the existing lighting system such as a sign box wall 102. A hook flange 246 extends upward from hook base 242. Hook flange 246 has a hook flange rim 250 projecting generally away from hook flange 246. Hook flange rim 250 is shaped to engage an LED string light 14. A hook flange gap 248 is defined between hook flange 246 and hook base 242. Hook flange gap 248 is generally shaped to receive part of the LED string light 14. A plurality of string light hooks 240 can be positioned at various locations in sign box 100, and an LED string light can span individual string light hooks. In some embodiments, hook base 242 may have an adhesive layer for adhesively securing the string light hook to the sign box wall 102 or other structure in the existing lighting system.

A further embodiment of the present invention provides a method of retrofitting a lighting system with a light emitting diode module. The method includes the steps of: (a) providing a conventional lighting system including a light bulb; (b) pressing a bulb bracket onto the fluorescent bulb, the bulb bracket including a bulb clip that receives the light bulb and a module clip shaped for receiving the light emitting diode module; and (c) attaching the light emitting diode module to the module clip. In some embodiments, the method can include the additional steps of (d) pressing a second bulb bracket onto the same light bulb and (e) attaching a second light emitting diode module to the same light emitting diode module to the second bulb bracket.

In some embodiments, a method of retrofitting a lighting system with a light emitting diode module includes installing a mounting bar between opposing walls of the lighting system and attaching a bar bracket to the mounting bar. A further step includes attaching a light emitting diode module to the bar bracket.

Thus, although there have been described particular embodiments of the present invention of a new and useful MOUNTING APPARATUS FOR A LIGHT EMITTING DIODE MODULE it is not intended that such references be construed as limitations upon the scope of this invention except as set forth in the following claims.

What is claimed is:

1. A bulb bracket apparatus for mechanically attaching a light emitting diode module to a light bulb, comprising:
   a module clip comprising first and second module clip arms;
   a concave module clip cavity defined between the first and second module clip arms, the module clip cavity shaped to receive the light emitting diode module;
   a bulb clip extending away from the module clip, the bulb clip comprising first and second bulb clip arms; and
   a concave bulb clip cavity defined between the first and second bulb clip arms, the bulb clip cavity shaped for receiving the light bulb.

2. The apparatus of claim 1, the bulb clip further comprising:
   the first bulb clip arm extends away from the module clip and has a concave shape substantially facing the bulb clip cavity; and
   the second bulb clip arm extends away from the module clip and has a concave shape substantially facing the bulb clip cavity.

3. The apparatus of claim 1, further comprising:
   a bulb clip cavity opening defined between the first and second bulb clip arms, the bulb clip cavity opening including a bulb clip cavity opening spacing, the bulb clip cavity opening spacing being smaller than a diameter of a light bulb.

4. The apparatus of claim 1, further comprising:
   a first module clip arm flange protruding from the first module clip arm toward the module clip cavity; and
   a first module clip arm channel defined in the first module clip arm.

5. The apparatus of claim 4, further comprising:
   a second module clip arm flange protruding from the second module clip arm toward the module clip cavity; and
   a second clip arm channel defined in the second module clip arm.

6. A light emitting diode module bracket assembly for attachment to a light bulb, comprising:
   a module cover; and
   a light emitting diode module base engaging the module cover, the module base including an integral bulb bracket, the integral bulb bracket further comprising
     a first base clip arm integrally formed on the module base and extending away from the module base,
     a second base clip arm integrally formed on the module base and extending away from the module base, and
     a concave base clip cavity shaped for receiving the light bulb defined between the first and second base clip arms.

7. The apparatus of claim 6, further comprising:
   a circuit board disposed between the module cover and the module base.

8. The apparatus of claim 7, further comprising:
   a light emitting diode disposed on the circuit board.

9. The apparatus of claim 6, further comprising:
   the integral bulb bracket defining a base clip inner diameter, wherein the base clip inner diameter is less than the diameter of the light bulb.

10. The apparatus of claim 6, wherein the first and second base clip arms resiliently clamp the light bulb when the light bulb is received in the base clip cavity.

11. An apparatus for supporting a light emitting diode module on a light bulb, comprising:
    a first mounting bar for the light emitting diode module;
    a first bulb support disposed on the first mounting bar, the first bulb support including first and second bulb support arms;
    a concave bulb support cavity shaped for receiving the light bulb defined between the first and second bulb support arms; and
    wherein the first and second bulb support arms resiliently clamp the light bulb when the light bulb is received in the bulb support cavity.

12. The apparatus of claim 11, further comprising:
    a second mounting bar slidably attached to the first mounting bar; and
    a second bulb support disposed on the second mounting bar.

13. The apparatus of claim 12, the second mounting bar comprising a second bar flange protruding substantially perpendicularly from the second mounting bar, the second bar flange having a second bar flange opening.

14. The apparatus of claim 11, the first mounting bar comprising a first bar flange protruding substantially perpendicularly from the first mounting bar, the first bar flange having a first bar flange opening.

15. The apparatus of claim 11, further comprising:
    a bar bracket comprising a bar clip and a light emitting diode module clip;
    the bar clip including first and second bar clip arms projecting from the bar bracket;
    a concave bar clip cavity shaped for receiving the mounting bar defined between the first and second bar clip arms;
    the light emitting diode module clip including first and second module clip arms projecting from the bar bracket;
    a concave light emitting diode module clip cavity defined between the first and second module clip arms; and
    the first mounting bar received in the bar clip cavity.

16. The apparatus of claim 15, wherein the bar clip and the light emitting diode module clip are pivotally connected at a pivoting clip joint.

17. A lighting system, comprising:
    a sign box;
    a gas discharge light bulb disposed in the sign box, the gas discharge light bulb having an exterior bulb surface; and
    a light emitting diode module mechanically attached to the exterior bulb surface of the gas discharge light bulb.

18. The system of claim 17, further comprising:
    a bulb bracket disposed between the light emitting diode module and the exterior bulb surface, the bulb bracket including a bulb clip resiliently clamping the exterior bulb surface of the gas discharge light bulb.

19. The system of claim 17, further comprising:
    a light emitting diode string light; and
    the light emitting diode module forming part of the light emitting diode string light.

20. A method of retrofitting a lighting system to include a light emitting diode mounted on a light bulb, comprising the steps of:
   (a) providing a lighting system including a light bulb;
   (b) clipping a bulb clip onto the light bulb, the bulb clip including a bulb bracket receiving the light bulb and a module bracket shaped for receiving a light emitting diode module; and
   (c) attaching a light emitting diode module to the module bracket.

21. The method of claim 20, further comprising the steps of:
   (d) pressing a second bulb clip onto the fluorescent bulb; and
   (e) attaching a second light emitting diode module to the same light emitting diode string light engine.

22. An illumination apparatus comprising:
   a lamp fixture;
   a gas discharge lamp mounted in the lamp fixture;
   a bulb bracket removably coupled to the gas discharge lamp, the bulb bracket comprising a module clip; and
   an LED module retained in the module clip.

23. The apparatus of claim 22, wherein the bulb bracket is radially positioned onto the gas discharge lamp.

24. The apparatus of claim 22, wherein the bulb bracket is axially positioned onto the gas discharge lamp.

* * * * *